(12) United States Patent
Tagami et al.

(10) Patent No.: US 8,092,883 B2
(45) Date of Patent: Jan. 10, 2012

(54) RESIN TANK WELD MEMBER

(75) Inventors: Hiroya Tagami, Oyama (JP); Tetsuya Takahashi, Shimotsuke (JP); Yukiya Ando, Kariya (JP)

(73) Assignees: Kyosan Denki Co., Ltd., Koga (JP); Denso Corporation, Kariya (JP)

( * ) Notice: Subject to any disclaimer, the term of this patent is extended or adjusted under 35 U.S.C. 154(b) by 778 days.

(21) Appl. No.: 12/003,034

(22) Filed: Dec. 19, 2007

(65) Prior Publication Data

US 2008/0160238 A1 Jul. 3, 2008

(30) Foreign Application Priority Data

Dec. 28, 2006 (JP) ................... 2006-353941

(51) Int. Cl.
*B29D 22/00* (2006.01)
*F16L 25/00* (2006.01)
*F16L 13/02* (2006.01)

(52) U.S. Cl. .................... 428/36.92; 428/35.7; 285/423; 285/288.1

(58) Field of Classification Search .............. 428/35.7, 428/36.92; 285/423, 288.1; 524/442, 514; 525/66, 183
See application file for complete search history.

(56) References Cited

U.S. PATENT DOCUMENTS

| | | | | |
|---|---|---|---|---|
| 3,494,504 A | * | 2/1970 | Jackson | 220/237 |
| 5,304,596 A | * | 4/1994 | Moriya et al. | 525/66 |
| 6,913,295 B2 | * | 7/2005 | Kimisawa et al. | 285/423 |
| 2007/0241557 A1 | * | 10/2007 | Sasai | 285/285.1 |
| 2009/0082512 A1 | | 3/2009 | Koyashiki et al. | |

FOREIGN PATENT DOCUMENTS

| | | |
|---|---|---|
| EP | 1 076 077 A1 | 2/2001 |
| EP | 1 312 647 A2 | 5/2003 |
| JP | A 08-003310 | 1/1996 |
| JP | 10-279752 A | 10/1998 |
| JP | A 10-279792 | 10/1998 |
| JP | 11181277 A * | 7/1999 |
| JP | 2000-095936 A | 4/2000 |
| JP | 2000-095948 A | 4/2000 |
| JP | A 2001-098147 | 4/2001 |
| JP | A 2001-302910 | 10/2001 |
| JP | 2002-069296 A | 3/2002 |
| JP | 2002-241546 A | 8/2002 |
| JP | 2002-275313 A | 9/2002 |
| JP | A 2002-284991 | 10/2002 |
| JP | 2002-332925 A | 11/2002 |
| JP | 2002-337558 A | 11/2002 |
| JP | 2002-370551 A | 12/2002 |
| JP | 2003020401 A * | 1/2003 |
| JP | B2 3409921 | 3/2003 |
| JP | A 2004-011419 | 1/2004 |
| JP | 2005-178529 A | 7/2005 |
| JP | A 2005-298639 | 10/2005 |
| JP | 2006-143172 A | 6/2006 |
| WO | WO 2006/101256 A1 | 9/2006 |

OTHER PUBLICATIONS

Machine Translation of JP 11181277 A, 1999.*
Machine Translation of JP 2003020401 A, 2003.*
German Office Action for German Application No. 10 2007 062 770.1 issued Jun. 20, 2011, with English-language translation.
Japanese Office Action issued in Japanese Application No. 2006-353941 on May 17, 2011 (with partial English-language translation).

* cited by examiner

*Primary Examiner* — Rena Dye
*Assistant Examiner* — James Yager
(74) *Attorney, Agent, or Firm* — Oliff & Berridge, PLC

(57) ABSTRACT

A resin tank weld member is a weld member that is to be welded to a resin tank that has a fuel permeation prevention function, for example, a pipe fitting, a fuel control valve such as a fuel escape prevention valve, an ORVR valve, etc., a pump, a filter device, etc. The resin tank weld member is formed from a single-layer material of a polyamide/polyolefin-based resin composition.

11 Claims, 5 Drawing Sheets

FLOAT CLOSED ←——→ FLOAT OPEN

ENLARGED VIEW
OF PORTION C

MORPHOLOGY OBSERVATION OF EXAMPLE 1

MORPHOLOGY OBSERVATION OF COMPARATIVE EXAMPLE 2

RESIN TANK WELD MEMBER

INCORPORATION BY REFERENCE

The disclosure of Japanese Patent Application No. 2006-353941 filed on Dec. 28, 2006 including the specification, drawings and abstract is incorporated herein by reference in its entirety.

BACKGROUND OF THE INVENTION

1. Field of the Invention

The invention relates to a resin tank weld member that allows a resin tank applied to, for example, a fuel tank or the like, to be attached with good precision and that restrains the escape of fuel, such as permeation of fuel and the like, from the fuel tank.

2. Description of the Related Art

In recent years, fuel tanks and, particularly, automotive fuel tanks, are subjected to increasingly severe requirements regarding the air-tightness for restraining the emission of fuel vapor that includes a hydrocarbon gas and the like to the outside, irrespectively of whether the vehicle is running or at a stop. It is strongly demanded as an urgent issue to reduce the leakage of fuel from the fuel tank as a matter of course, and also from various component parts attached directly or indirectly to the fuel tank, for example, a pipe fitting, a fuel control valve, a pump, a filter device, etc., and also sites of attachment to such component parts.

Furthermore, the demand for weight reduction and cost reduction of motor vehicles has also become severe. Along with this trend, fuel tanks made of plastics have been developed. At present, the use of tanks made of high-density polyethylene (HDPE) resin excellent in rust resistance and for weight reduction or the like has become mainstream. Accordingly, various component parts attached directly or indirectly to such a fuel tank are also made of resin. In order to facilitate the attachment of such component parts to the fuel tank, the same resin as that of the fuel tank is used for attachment portions of the component parts that are provided for attachment to the fuel tank, and means for joining the component parts and the fuel tank through heat welding is adopted.

In conjunction with the foregoing present circumstances, a fuel tank and various component parts attached to the fuel tank as described below are known.

That is, a fuel tank is formed integrally as one unit by using a resin in accordance with requirements for weight reduction and the like. To form such a fuel tank, a high-density polyethylene resin that is low in cost and excellent in impact resistance is used. However, the high-density polyethylene resin is known to allow the permeation of hydrocarbon although in small amount. To eliminate such a drawback, a laminated structure of a fuel tank wall as shown in FIG. 7 has been proposed.

A wall of the fuel tank 1 has a laminated structure that is basically composed of an inner shell 2 that constitutes an inside portion of the tank, an outer shell 3 that constitutes an outside portion of the tank, and a barrier layer 4 that is interposed between the inner shell 2 and the outer shell 3 and that prevents the permeation of hydrocarbon gas. In addition, adhesion layers are provided between the barrier layer 4 and the inner shell 2 as well as between the barrier layer 4 and the outer shell 3.

Concretely, the inner shell 2 and the outer shell 3 are formed by using a conventional high-density polyethylene resin, and the adhesion layers are formed by using a modified high-density polyethylene resin having adhesiveness (which, despite having adhesiveness, allows the permeation of hydrocarbon gas) which is obtained by improving a function of a high-density polyethylene resin, and the barrier layer 4 is formed by using a resin that prevents the permeation of hydrocarbon gas, for example, an EVOH resin (Eval) made by Kuraray, Co. Ltd., etc. Thus, countermeasures against the fuel permeation can be said to be substantially perfectly taken with respect to the fuel tank.

A pipe fitting 5 shown in FIG. 6 is known as a resin tank weld member that is attached to the fuel tank 1. The pipe fitting 5 has a body portion 6 and a tube portion 7. The body portion 6 is a cup-shape portion made of a high-density polyethylene resin, and has in its bottom portion a tubular weld portion 8. The weld portion 8 is welded to an outer peripheral surface of an upper portion of an opening 9 provided in an upper wall of the resin tank 1. Besides, the tube portion 7 is a cylindrically tubular polyamide resin-made portion that is formed on a side surface of an upper portion of the body portion 6 so as to be integral with the body portion 6. A hose is pressingly connected to a distal end of the tube portion 7, and links it in communication with a canister (not shown), so that fuel vapor from the fuel tank 1 is adsorbed to the canister.

A pipe wall of the pipe fitting 5 is formed by an inner peripheral layer 10 made of a polyamide (PA) resin of low permeability, and an outer peripheral layer 11 made of a modified high-density polyethylene resin excellent in the weldability to the fuel tank 1 and the adhesiveness to the polyamide resin of the inner peripheral layer 10. The inner peripheral layer 10 and the outer peripheral layer 11 are formed as follows. Firstly, the outer peripheral layer 11 is formed by pouring a modified high-density polyethylene resin into a mold. Then, the inner peripheral layer 10 is formed by pouring a polyamide (PA) resin to an inner side of the outer peripheral layer 11. That is, the pipe fitting 5 is produced by two-step forming (Japanese Patent Application Publication No. 2004-11419 (JP-A-2004-11419)).

The conventional polyamide (PA) resin of low permeability is able to prevent the emission of fuel gas into the atmosphere, but is not able to prevent it perfectly. For example, the polyamide (PA) resin is not altogether sufficient to meet the "P-ZEV" regulation that is already in force in the United States.

With regard to the conventional component, there are disclosed a method that uses a composite resin composition of polyolefin and polyamide containing an aromatic polymer (Japanese Patent Application Publication No. 2005-298639 (JP-A-2005-298639)), and a method that uses a composite resin composition of a polyamide resin and a polyphenylene sulfide resin (Japanese Patent Application Publication No. 2002-284991 (JP-A-2002-284991)). However, these methods have problems, for example: an expensive resin composition is used; there is constraint in the design of the mold since a band-like dispersion layer is formed in the molding; etc. Furthermore, there is also disclosed a method that uses a resin obtained by compounding a polyolefin resin and a lamellar silicate in a polyamide resin (Japanese Patent Application Publication No. 2001-302910 (JP-A-2001-302910)). This method is different from the invention in that the polyolefin layer in the method is a continuous layer. Therefore, this conventional method has problems of being poor in the heat-weldability to the fuel tank member despite being excellent in terms of the gas permeation.

As for the resin composition incorporating a lamellar silicate, there have been proposed a composition obtained by polymerizing 100 mass parts of polyamide in coexistence with an acid whose pKa is 0 to 6, and further mixing polyolefin or the like into the polymer (Japanese Patent No.

3409921), a resin composition obtained by mixing an ultra-high molecular weight polyolefin and a resin in which a swellable synthetic fluorine mica is homogeneously dispersed in a polyamide resin (Japanese Patent Application Publication No. 10-279792 (JP-A-10-279792)), and a mixture of a polyolefin or the like and a resin composition in which a swellable fluorine mica-based mineral is dispersed at a molecular level in order to achieve high oxygen gas barrier characteristic (Japanese Patent Application Publication No. 2001-98147 (JP-A-2001-98147)). However, in each one of these compositions, the amino-terminal group concentration in the polyamide resin or the amount of maleic anhydride in the polyolefin and the like is not controlled to an amount that is suitable to the component part that is welded to the fuel tank. Therefore, with regard to the obtained mixture with polyolefin or the like, there is a problem in the compatibility between good welding strength to the polyolefin resin and good resistance to the gas permeation. It has been requested a measure to decrease a leakage of a fuel to the outside as much as possible.

In addition, in the conventional art, the polyamide resin of low permeability is provided only up to a vicinity of the weld portion 8 of the fuel tank 1, and fuel leakage occurs as stated below. That is, as shown in FIG. 7, fuel vapor shown by arrowed lines encircled one and encircled seven is shielded by the inner peripheral layer 10 and the barrier layer 4, respectively, so that substantially no fuel vapor is emitted to the outside.

However, as for a flow of fuel vapor as shown by an arrowed line encircled three, fuel vapor is emitted to the outside through the outer peripheral layer 11 that is not of low permeability as shown by an arrowed line encircled five, and is also emitted to the outside through the outer shell 3 that is also not of low permeability as shown by an arrowed line encircled six.

Furthermore, in the foregoing conventional art, since the two-step forming in which the inner peripheral layer 10 is poured to the inner side of the outer peripheral layer 11 is adopted, there is a drawback of an increase in the number of formation processes and therefore a corresponding rise in the production cost. Furthermore, the two-step forming allows the formation of shapes only to a limited range, and thus suffers from a drawback of a constraint on the degree of freedom in the shape.

SUMMARY OF THE INVENTION

The invention provides a resin tank weld member that meets a regulation severer than conventional regulations and that reduces the production cost, by forming the resin tank weld member from a single-layer wall material of a polyamide/polyolefin-based resin composition that has an even lower permeability than the related-art low-permeability resin.

A first aspect of the invention is a welding member with respect to a resin tank, wherein the welding member is formed from a single-layer material of a polyamide/polyolefin-based resin composition obtained from 100 mass parts of a polyamide resin composition in which 2 to 20 mass parts of a silicate layer of a swellable lamellar silicate is dispersed at a molecular level with respect to 100 mass parts of a polyamide resin, and whose relative viscosity measured with a solvent of a 96 mass % concentrated sulfuric acid in a condition of a temperature being 25° C. and a concentration being 1 g/dl is greater than or equal to 2.0, and whose amino-terminal group content is less than or equal to 0.07 mmol/g, and 50 to 150 mass parts of a polyolefin-based resin composition obtained by modifying 1.0 to 4.0 mass parts per 100 mass parts of a polyolefin-based resin whose density is greater than or equal to 0.92 g/cm$^3$. Due to this construction, the permeation of fuel through a resin tank weld member, including a weld portion welded to the fuel tank, is reduced, and the production cost of the resin tank weld member is reduced. In the first aspect, it is possible to reduce the permeation of fuel through the weld portion welded to the fuel tank, as a matter of course, and also through portions other than the weld portion to a greater extent of reduction and also to meet a severer regulation than in the related art. Besides, since the resin tank weld member is formed of the single-layer construction, the resin tank weld member allows a reduction of the production cost. Furthermore, since the resin tank weld member is formed of the single-layer construction, the degree of freedom in the shape of the resin tank weld member can be heightened.

In the first aspect, the polyolefin-based resin may have an island structure in the polyamide/polyolefin-based resin composition. This construction further reduces the permeation of fuel through the resin tank weld member including the weld portion welded to the fuel tank, and also reduces the production cost of the resin tank weld member. Besides, this construction is able to reduce the permeation of fuel through the weld portion welded to the fuel tank, as a matter of course, and also through portions other than the weld portion to a greater extent than the related art, and is also able to meet a severer regulation than the related art.

In the first aspect, the resin tank weld member, together with a case having a valve member, may form a fuel control valve. This construction reduces the permeation of fuel at the fuel control valve as well, and also reduces the production cost of the resin tank weld member. Since the resin tank weld member is formed as a component part of the fuel control valve, the resin tank weld member in the fuel control valve can also achieve substantially the same effect as mentioned above.

The case may be welded to the resin tank weld member at a location inward of a weld portion between the resin tank weld member and the resin tank. This construction restrains the permeation of fuel through the case, and also makes it easy to join the resin tank weld member and the case. Since the case is welded to the resin tank weld member at a location inward of the weld portion between the resin tank weld member and the resin tank, the case is disposed in such a fashion that the case is surrounded by a member that has a fuel permeation prevention function. In conjunction with the fuel control valve, too, the substantially the same effect as mentioned above can be achieved. Besides, the case can be disposed at any location in a bottom portion of the resin tank weld member as long as the location is inward of the weld portion between the resin tank weld member and the resin tank. Therefore, the degree of freedom of the attachment can be heightened, and the attachment can be made easier.

The case may be attached to the resin tank weld member by snap fitting (which is also called forced fitting) at a location inward of a weld portion between the resin tank weld member and the resin tank. This construction restrains the permeation of fuel from the case, and also makes it easy to join the resin tank weld member and the case. Since the case is attached to the resin tank weld member by snap fitting (which is also called forced fitting) at a location inwardly of the weld portion of the resin tank and the resin tank weld member, the case is disposed in such a fashion as to be surrounded by a member that has a fuel permeation prevention function. Thus, in conjunction with the fuel control valve as well, substantially the same effect as described above can be achieved. Besides, the case can be disposed at any location in a bottom portion of the resin tank weld member as long as the location is inward of the weld portion between the resin tank weld member and the resin tank. Therefore, the degree of freedom of the attachment can be heightened, and the attachment can be made easier.

In the first aspect, the resin tank may have a laminated structure that includes at least an outer shell that is outwardly located, and a fuel permeation prevention layer that is located inwardly of the outer shell. This construction reduces the permeation of fuel from the fuel tank system.

A length (height) of a weld portion of the resin tank weld member may be greater than a thickness of the outer shell. The welding between the weld portion of the resin tank weld member and the resin tank is carried out by heating the weld sites of the two members and pressing the two members against each other so as to be firmly bonded. In that construction, for example, by heightening the heating temperature at the resin tank side, the weld portion of the resin tank weld member can be pressed deeply into the outer shell of the resin tank. That is, due to the foregoing construction, a distal end of the weld portion of the resin tank weld member can be pressed into the vicinity of the barrier layer of the resin tank, and the gap between the distal end of the weld portion of the resin tank weld member and the barrier layer of the resin tank can be reduced in size. Therefore, the emission of fuel to the outside as shown by a line encircled six in FIG. 7 is reduced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments

Figure 1:
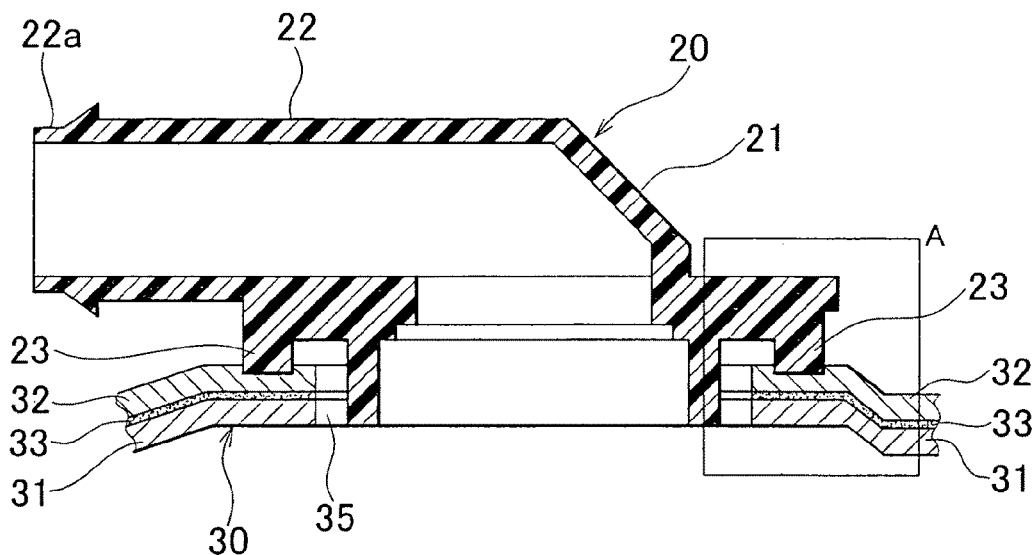
FIG. 1 is a sectional view of a resin tank weld member (pipe fitting) in accordance with an embodiment of the invention.
Figure 2:
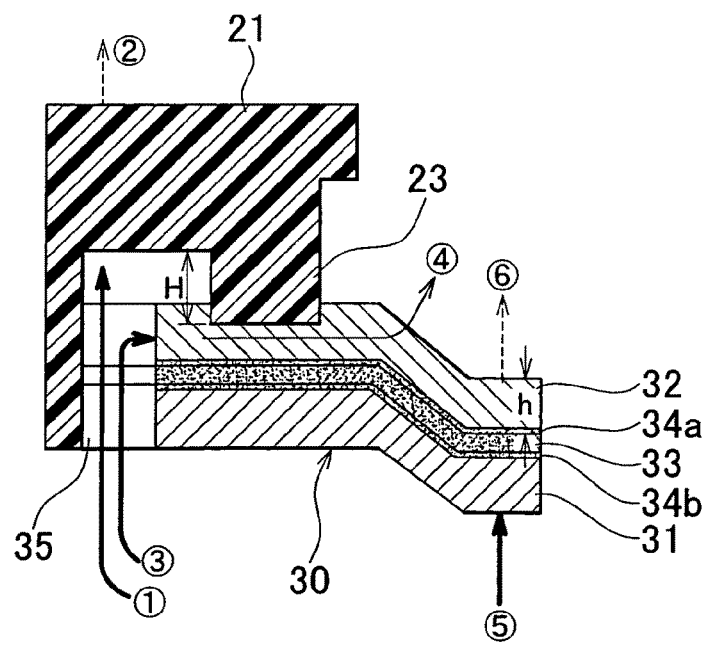
FIG. 2 is an enlarged sectional view of a portion A shown in FIG. 1.
Figure 3:
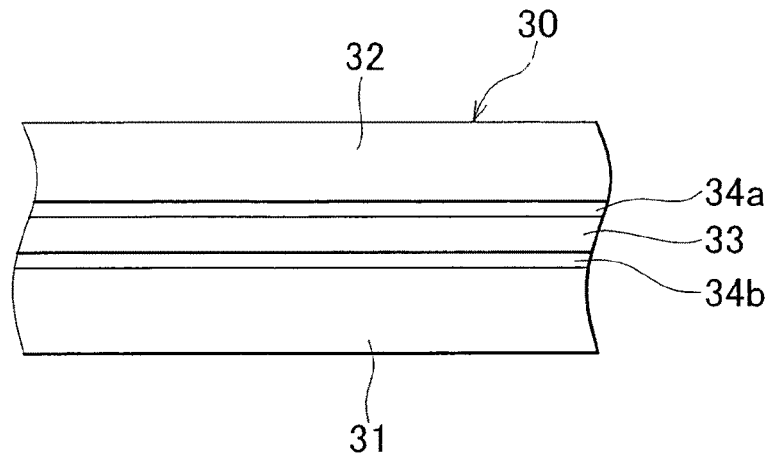
FIG. 3 is an enlarged fragmentary sectional view of a fuel tank that is a resin tank.

FIGS. 1 to 3 show resin tank weld members and the like. FIG. 1 is a sectional view showing a state in which a resin tank weld member is attached to a fuel tank that is a resin tank that has a fuel permeation restraining function. FIG. 2 shows an enlarged view of a portion A enclosed by a square in FIG. 1. FIG. 3 is an enlarged fragmentary sectional view of a fuel tank that is a resin tank.

The resin tank of the invention may be any resin-made tank that holds fuel therein. In the following description, the resin tank is assumed to be a fuel tank. Besides, the resin tank weld member may be any member that is attached to a resin tank. For example, the resin tank weld member may be a pipe fitting, a fuel control valve such as a fuel escape prevention valve, an ORVR valve, etc., a pump, a filter device, etc. If the resin tank weld member is a pipe fitting, the resin tank weld member includes a pipe portion and a whole portion for attachment to the fuel tank. If the resin tank weld member is any one of a fuel control valve, a pump, a filter device, etc., the resin-tank welding member includes a case that houses such a device or the like.

FIG. 1 shows an example of a pipe fitting. The pipe fitting 20 has a body portion 21 and a tube portion 22, and is a single-layer member formed of a polyamide/polyolefin-based resin composition that is a low-permeability resin described below. The body portion 21 is a generally cup-shape portion whose bottom portion is provided with a downwardly extending annular weld portion 23 that is to be welded to the fuel tank 30. The tube portion 22 is an L-shape tube portion that is formed integrally with an upper portion of the body portion 21. An end of the tube portion 22 communicates with a hollow portion of the body portion 21, and the other end thereof is attached to another linking pipe. After the entire pipe fitting 20 is assembled, the fuel vapor composed of a hydrocarbon gas and the like that is generated in the fuel tank 30 is discharged via the pipe fitting 20 and the liking pipe, and, for example, is adsorbed to a canister (not shown).

The fuel tank 30 is composed of a five-layer structure of an inner shell 31 that forms an inner side portion, an outer shell 32 that forms an outer side portion, a barrier layer 33 as a fuel permeation prevention layer disposed between the inner shell 31 and the outer shell 32 which prevents the permeation of fuel, and an upper adhesion layer 34a and a lower adhesion layer 34b that are interposed between the inner shell 31 and the barrier layer 33 and between the outer shell 32 and the barrier layer 33, respectively. As shown in FIG. 2, the length (or the height) H of the weld portion 23 provided at the bottom portion of the body portion 21 is set greater than the thickness h of the outer shell 32 of the fuel tank 30.

Concretely, the inner shell 31 and the outer shell 32 are made of a high-density polyethylene resin. The upper adhesion layer 34a and the lower adhesion layer 34b are made of a modified high-density polyethylene resin having adhesiveness (that allows the permeation of hydrocarbon gas despite having adhesiveness) obtained by improving a function of a high-density polyethylene resin. The barrier layer 33 is made of a resin that prevents the permeation of fuel, for example, EVOH resin (Eval) made by Kuraray, Co. Ltd., etc. As a result, if fuel in the fuel tank 30 permeates as shown by a thick solid arrow encircled five, fuel permeates through the inner shell 31, but is blocked by the barrier layer 33. Therefore, there is substantially no fuel vapor that leaks out as shown by the arrow encircled six.

The fuel tank 30 and the pipe fitting 20 are heat-welded, for example, in the following fashion. That is, the pipe fitting 20 is mounted on the fuel tank 30 in such a manner as to surround an opening 35 provided in the fuel tank 30, and the fuel tank 30 and the weld portion 23 of the pipe fitting 20 are brought close to each other. Then, a hot plate (not shown) is placed between the weld sites of the fuel tank 30 and the weld portion 23 to heat the weld sites of the fuel tank 30 and the weld portion 23. At the time point when the weld sites of the fuel tank 30 and the weld portion 23 have been heated so that the weld sites are weldable, the hot plate is removed. Then, the pipe fitting 20 is pressed against the fuel tank 30 so as to weld and join the fuel tank 30 and the weld portion 23. This weld joint may be accomplished not only by using a hot plate, but also by employing a vibration weld, an ultrasonic weld, etc.

Incidentally, at the time of the welding, the weld portion 23 can be pressed more deeply into the outer shell 32, for example, by making the temperature of the weld site of the outer shell 32 higher than the heated temperature of the weld portion 23 provided at the bottom of the body portion 21. That is, in this example, as stated above, the length H of the weld portion 23 is set greater than the thickness h of the outer shell 32 of the fuel tank 30. Therefore, by pressing a distal end of the weld portion 23 made of a low-permeability resin into a vicinity of the barrier layer 33 of the fuel tank 30, the permeation of fuel shown by the arrow encircled four in FIG. 2 can be reduced.

In the embodiment, due to the adoption of the above-described weld structure, even if fuel in the fuel tank 30 tends to escape through the fuel tank wall as shown by the thick arrow encircled five, the fuel is blocked by the barrier layer 33, so that there is substantially no fuel that escapes as shown by an arrow encircled six. Furthermore, even if fuel tends to escape via the pipe fitting 20 as shown by the arrow encircled one, there is substantially no fuel that escapes as shown by the arrow encircled two since the pipe fitting 20 is shielded with a polyamide/polyolefin-based resin composition described below.

Figure 7:
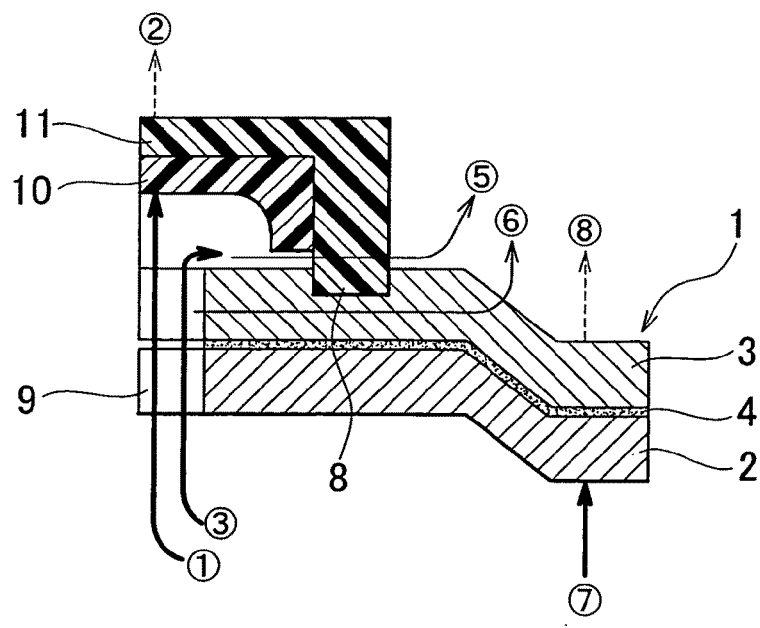
FIG. 7 is an enlarged sectional view of a portion B shown in FIG. 6.

Furthermore, while in the related art shown in FIG. 7 there is an escape as shown by the arrow encircled five at the weld sites of the fuel tank 30 and the weld portion 23 of the pipe fitting 20, such escape is eliminated in the above-described example. Furthermore, although escape of fuel as shown by the arrows the solid arrows encircled three and four still remains, the escape as shown by the solid arrow encircled four can be reduced by pressing the distal end of the weld portion 23 deeply into the outer shell 32.

Figure 4:
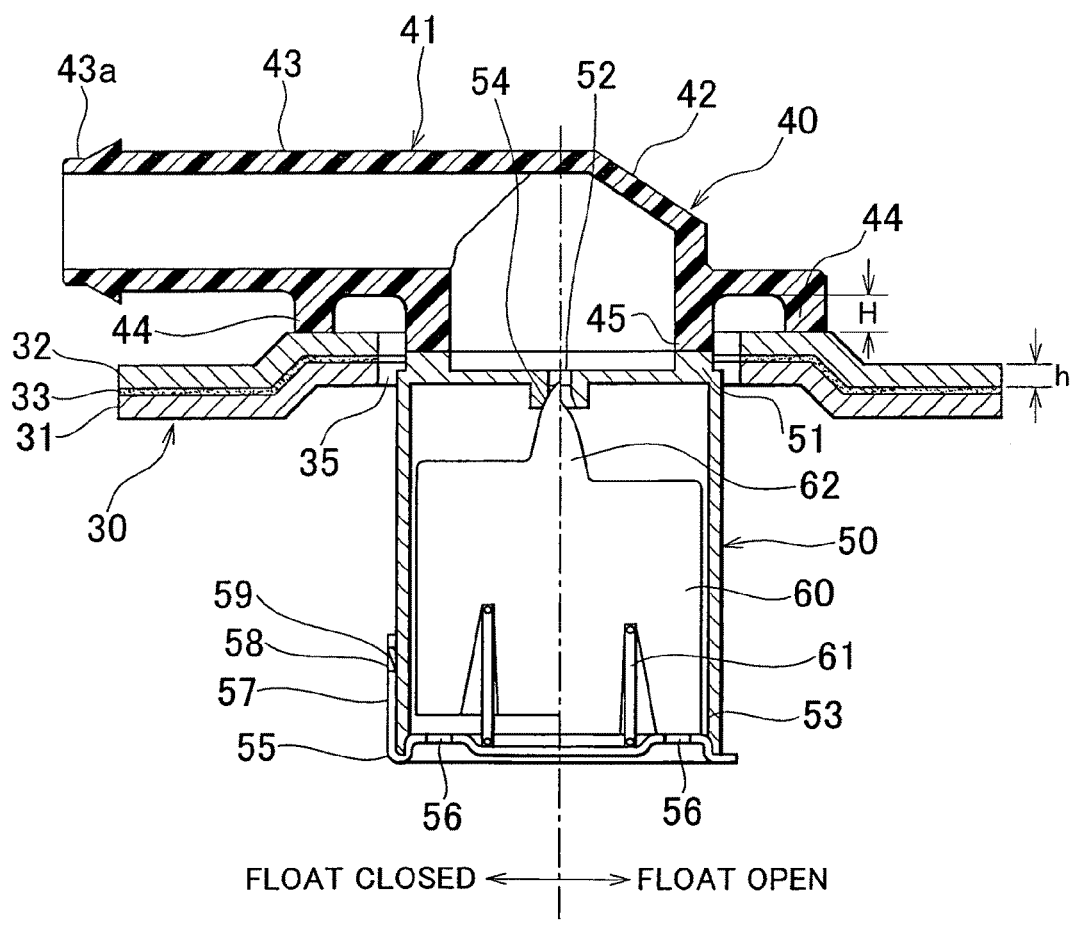
FIG. 4 is a sectional view of a resin tank weld member (fuel escape prevention valve) in accordance with another embodiment of the invention.
Figure 5:
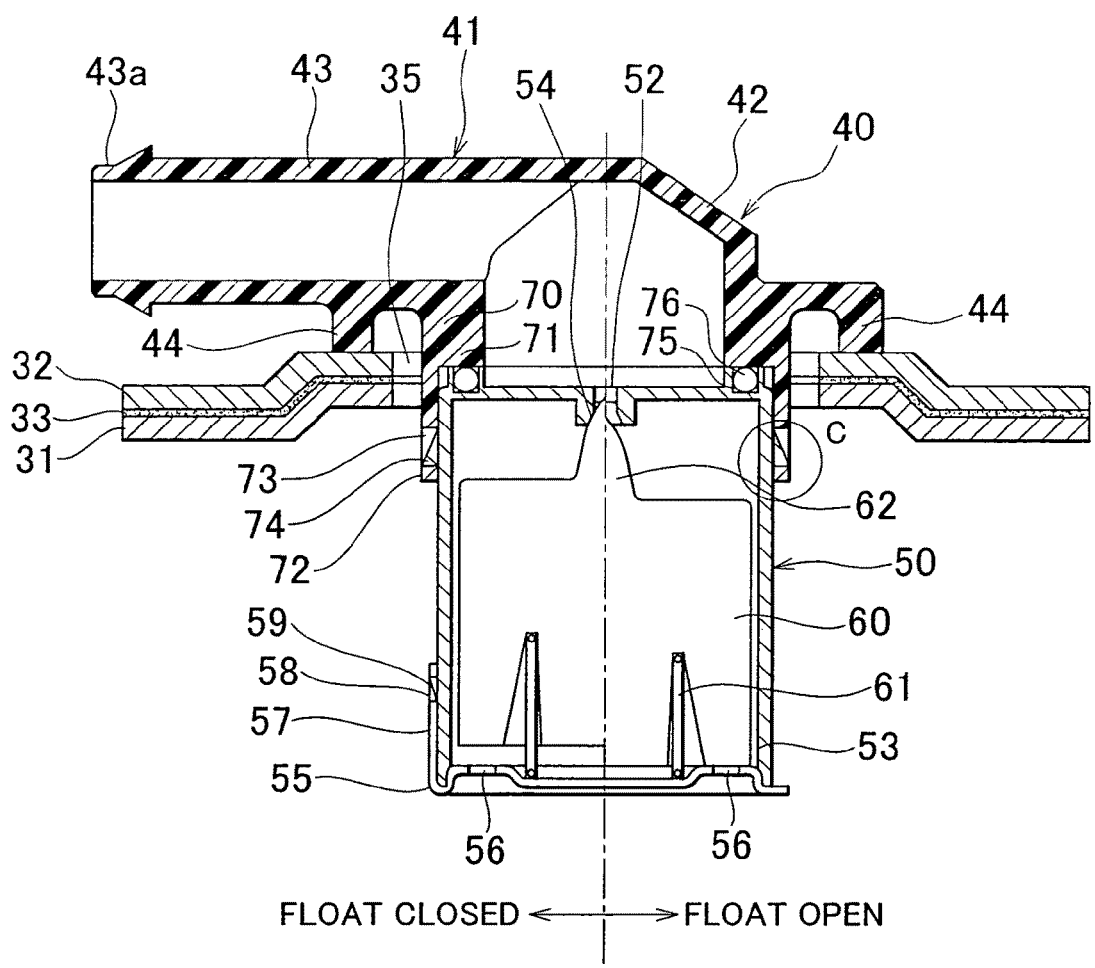
FIG. 5 is a sectional view of a resin tank weld member (fuel escape prevention valve) in accordance with still another embodiment of the invention.
Figure 5:
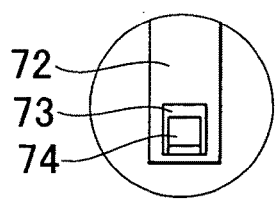
Figure 6:
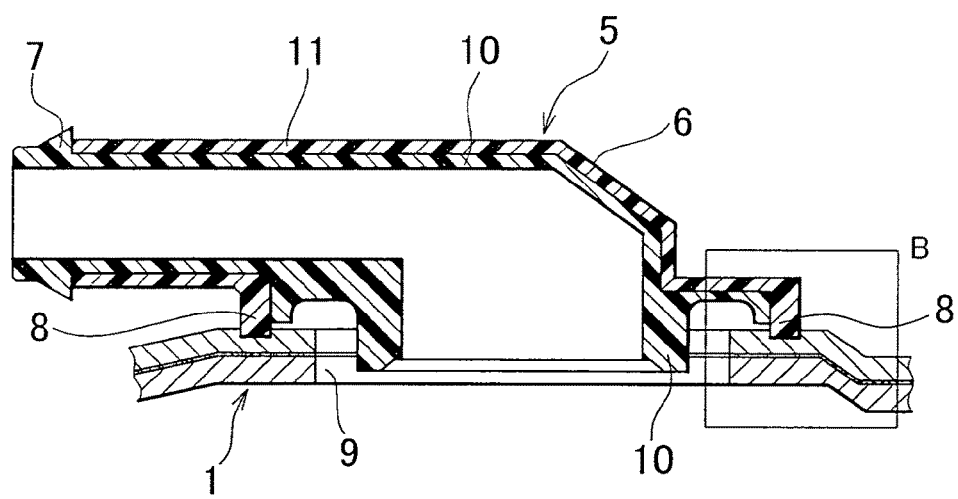
FIG. 6 is a sectional view of a related-art resin tank weld member (pipe fitting)

Next, an example in which a resin tank weld member is used as a member of a fuel escape prevention valve that is a fuel control valve will be described. FIG. 4 shows a sectional view of a fuel escape prevention valve formed by welding a cap that is a resin tank weld member, and a case. FIG. 5 is a sectional view of a fuel escape prevention valve formed by attaching a cap that is a resin tank weld member and a case via snap fitting (that is fixation means in which a latch protrusion is fitted into a latch groove, and that is also termed forced fitting).

A fuel escape prevention valve 40 is made up of a cap 41, a case 50, a float 60, etc., and is attached to an upper wall surface of a fuel tank 30. The cap 41 is a resin tank weld member that corresponds to the pipe fitting 20. The cap 41 is a single-layer member that has a body portion 42 and a tube portion 43 and that is formed from a below-described polyamide/polyolefin-based resin composition that is a low-permeability resin. The body portion 42 is a generally cup-shape portion. A bottom portion of the body portion 42 is provided with a downward extending annular first weld portion 44 that is welded to the fuel tank 30, and with a downward extending annular second weld portion 45 that is located inwardly of the first weld portion 44, and that is longer than the first weld portion 44 in terms of the length in the direction of a center axis, and that is welded to an upper surface of the case 50.

The tube portion 43 is an L-shape tube portion that is formed integrally with an upper portion of the body portion 42. An end of the tube portion 43 communicates with a hollow portion of the body portion 42, and a pipe end 43a of the body portion 42, at the other end, is attached to another linking pipe. After the entire fuel escape prevention valve 40 is assembled, the fuel vapor composed of a hydrocarbon gas and the like that is generated in the fuel tank 30, for example, is adsorbed to a canister (not shown).

The fuel tank 30 is the same as the one described above. That is, the fuel tank 30 is composed of a five-layer structure of an inner shell 31 that forms an inner side portion, an outer shell 32 that forms an outer side portion, a barrier layer 33 as a fuel permeation prevention layer disposed between the inner shell 31 and the outer shell 32 which prevents the permeation of fuel, and an upper adhesion layer 34a and a lower adhesion layer 34b that are interposed between the inner shell 31 and the barrier layer 33 and between the outer shell 32 and the barrier layer 33, respectively. As shown in FIG. 4, the length H of a first weld portion 43 provided in a bottom portion of the body portion 42 is set greater than the thickness h of the outer shell 32 of the fuel tank 30.

The fuel tank 30 and the cap 41 are heat-welded, for example, in the following fashion. That is, the cap 41 is mounted on the fuel tank 30 in such a manner as to surround an opening 35 provided in the fuel tank 30, and the fuel tank 30 and the cap 41 are brought close to each other. Then, a hot plate (not shown) is placed between the weld sites of the fuel tank 30 and the first weld portion 44 to heat the weld sites of the fuel tank 30 and the first weld portion 44. At the time point when the weld sites of the fuel tank 30 and the first weld portion 44 have been heated so that the weld sites are weldable, the hot plate is removed. Then, the cap 41 is pressed against the fuel tank 30 so as to weld and join the fuel tank 30 and the first weld portion 44. This weld joint may be accomplished not only by using a hot plate, but also by employing a vibration weld, an ultrasonic weld, etc.

The case 50 is attached to the second weld portion 45 of the cap 41. The case 50 is a resin-made tubular member that has a smaller outside diameter than the opening 35 of the fuel tank 30. An outer peripheral portion of an upper wall surface of the case 50 is provided with an annular protrusion 51, and a central portion of the upper wall surface has a small-diameter opening portion 52 on whose inner bottom surface a valve seat 54 is formed. Then, the annular protrusion 51 is welded to the second weld portion 45 of the cap 41, for example, by the above-described weld means. Since the second weld portion 45 is provided inwardly of the first weld portion 44, the case 50 is surrounded by a low-permeability resin after the assembly. Thus, it becomes possible to form the case 50 from a low-cost resin.

A large-diameter opening portion 53 is formed in a bottom portion of the case 50. Via the large-diameter opening portion 53, a float 60 is housed in the case 50. Then, a bottom plate 55 is attached. The bottom plate 55 is provided with a plurality of communication openings 56 in a concentric arrangement. After attachment, the fuel vapor in the fuel tank 30 enters the case 50 via the communication openings 56. An outer peripheral end of the bottom plate 55 is provided with a plurality of latch protrusion pieces 57 that are orthogonally bent and that have at there distal ends rectangular latch holes 58. The bottom plate 55 is pushed over the large-diameter opening portion 53 of the case 50 with the latch protrusion pieces 57 leading. The bottom plate 55 is fixed by snap-fitting latch holes 58 of distal ends of the latch protrusion pieces 57 onto latch nails 59 formed on an outer peripheral surface of a lower portion of the case 50.

The float 60, inserted into the case 50 before the bottom plate 55 is attached to the case 50. Between an inward bottom portion of the float 60 and an upper surface of the bottom plate 55, a spring 61 is interposed. This spring 61 supports the upward movement of the float 60 when fuel enters the case 50. In addition, a center portion of an upper surface of the float 60 has a conical valve body 62. This valve body 62, during an ordinary state, is apart from the valve seat 54 as in a right-side illustration in FIG. 4 named as "FLOAT IS OPEN". However, when fuel enters the case 50 due to, for example, a tilt of the motor vehicle or the like, the float 60 moves upward and contacts the valve seat 54 to prevent the escape of fuel to the cap side.

In this construction, too, if the cap 41 of the fuel escape prevention valve is formed from a polyamide/polyolefin-based resin composition, which is a low-permeability resin, the escape of fuel to the outside can be reduced further in comparison with the related-art fuel escape prevention valve.

FIG. 5 shows a fuel escape prevention valve similar to the above-described one in which a case 50 is snap-fit engaged with a cap 41. The difference from the fuel escape prevention valve shown in FIG. 5 is different from the one shown in FIG. 4 mainly lies in the attachment sites of the cap 41 and the case 50. Such differences will be manly described.

Specifically, a second attachment portion 70 is formed at a site that corresponds to the second weld portion 45 of the cap 41 shown in FIG. 4. The second attachment portion 70 is made up of an annular projected portion 71 similar to the second weld portion 45, and a plurality of attachment protrusion pieces 72. The attachment protrusion pieces 72 are long narrow rectangular portions extending downward from an outer peripheral end of a bottom portion of the projected portion 71 and having an arc shape in cross section. A distal end portion of each attachment protrusion piece 72 has a rectangular latch hole 73. The attachment protrusion pieces 72 are substantially equidistantly provided, and are arranged so as to have a diameter that is slightly larger than the outside diameter of the case 50.

Although the case 50 is basically the same as that shown in FIG. 4, an annular groove 75 is formed in a portion that corresponds to the annular protrusion 51 shown in FIG. 4, and an O-ring 76 is fitted in the annular groove 75. Besides, an upper outer peripheral portion of the case 50 is provided with a plurality of latch nails 74 that are engageable with the latch holes 73 formed in the distal end portions of the attachment protrusion pieces 72.

The attachment is carried out as follows. That is, after the O-ring 76 is attached to the annular groove 75 of the case 50, the case 50 is pushed inside the attachment protrusion pieces 72 of the second attachment portion 70, with the O-ring 76 leading, until the latch nails 74 of the case 50 are engaged with the latch holes 73 of the attachment protrusion pieces 72 by snap fitting (or forced fitting). The case 50 is thus fixed.

In this attachment construction, there is a gap between the attachment portions. Therefore, for example, when the motor vehicle tilts, fuel tends to exit into the internal space of the cap 41 through the gap, but is blocked by the O-ring 76 that is disposed between the gap and the internal space. Thus, the fuel escape prevention valve in FIG. 5, similar to the one shown in FIG. 4, reduces the leakage of fuel to the outside in comparison with the related-art fuel escape prevention valve.

Next, the composition of the resin tank weld member will be hereinafter described in detail.

This embodiment provides a resin composition that is excellent in fuel permeation resistance, and that is excellent in welding strength in the case where the resin composition is welded with a polyolefin-based resin composition. Furthermore, the embodiment provides a resin composition that shows a reduced decline in welding strength in the case where a weld product obtained by welding the resin composition and a polyolefin-based resin composition is dipped in fuel. Concretely, in the working examples and the like regarding this embodiment, it was assumed as a reference that a polyamide/polyolefin-based resin composition obtained from a polyamide resin composition (A) and a polyolefin-based resin composition (B), and another polyolefin-based resin composition, when welded together, have a welding strength of 15 MPa or higher, and have a post-fuel immersion welding strength retention rate of 60%, and have a fuel permeation rate of 0.50 mg·mm/cm$^2$·24 h. Incidentally, the measurement methods and the like for these values will be described below.

The inventors have found that a polyamide/polyolefin resin composition obtained from a polyamide resin composition (A) in which a silicate layer of a swellable lamellar silicate is dispersed at molecular level and a polyolefin-based resin composition (B) modified by an acid anhydride or the like contributes to the solution of the aforementioned issues.

That is, a polyamide/polyolefin-based resin composition of the embodiment of the invention is a polyamide/polyolefin-based resin composition made of a polyamide resin composition (A) in which 2 to 20 mass parts of a silicate layer of a swellable lamellar silicate is dispersed at a molecular level with respect to 100 mass parts of a polyamide resin, and whose relative viscosity measured with a solvent of a 96 mass % concentrated sulfuric acid in a condition of a temperature being 25° C. and a concentration being 1 g/dl is greater than or equal to 2.0, and whose amino-terminal group content is less than or equal to 0.07 mmol/g, and a polyolefin-based resin composition (B) obtained by modifying 1.0 to 4.0 mass partsper 100 mass parts of a polyolefin-based resin whose density is greater than or equal to 0.92 g/cm$^3$, by using an acid anhydride or the like, wherein the polyamide/polyolefin-based resin composition is obtained from 100 mass parts of the polyamide resin composition represented by (A) and 50 to 150 mass parts of the polyolefin-based resin composition represented by (B).

The polyamide resin composition (A) is a composition in which a silicate layer of a swellable lamellar silicate is dispersed at a molecular level in a polyamide resin matrix. Herein, the silicate layer is a basic unit that constitutes the swellable lamellar silicate, and is a planar inorganic crystal obtained by breaking the layer structure of the swellable lamellar silicate (hereinafter, referred to as "cleaving"). In this embodiment, the silicate layer means a state in which polyamide molecular chains are inserted in the individual silicate layers or between the layers and the layer structure is not completely broken. It is not necessary in this state that the layer be separated into single layers.

The being dispersed at molecular level refers to a state in which when silicate layers of a swellable lamellar silicate are dispersed in the polyamide resin matrix, the silicate layer exist with an interlayer distance of 1 nm or greater in average being left between one another, without forming aggregate with one another. The aggregate refers to a state in which the swellable lamellar silicate as a raw material is not cleaved at all. The interlayer distance is a distance between the centers of gravity of the silicate layers. Such a state can be confirmed, with regard to test pieces of a polyamide composite material, for example, by conducting a transmission electron microscope observation.

It is desirable that the swellable lamellar silicate used in this embodiment have a structure that is made up of negatively charged crystal layers whose main component is a silicate, and cations that exist between the crystal layers and that have an ion exchange capability, and that the positive-ion exchange capacity found by a method described below be greater than or equal to 50 milliequivalent/100 g. If the positive ion exchange capacity is less than 50 milliequivalent/100 g, the swelling capability is low so that at the time of production of a polyamide composite material, the swellable lamellar silicate remains in a substantially uncleaved state. Therefore, improvement in performance is not recognizable. In this embodiment, there is no particular restriction about the upper limit of the value of the positive-ion exchange capacity, and it suffices that a suitable swellable lamellar silicate be selected from the swellable lamellar silicates that are actually preparable.

The swellable lamellar silicate may be a naturally produced one, or may also be an artificially synthesized or modified one. Examples of the swellable lamellar silicate include a smectite family (montmorillonite, beidellite, hectorite, sauconite, etc.), a vermiculite family (vermiculite, etc.), a mica family (fluorine mica, muscovite, paragonite, bronze mica, lepidolite, etc.), a brittle mica family (margarite, clintonite, anandite, etc.), and a chlorite family (donbassite, sudoite, cookeite, clinochlore, shamonite, nimite, etc.). In this embodiment, Na-type or Li-type swellable fluorine micas and montmorillonites can be particularly preferably used.

The swellable fluorine mica preferably usable in this embodiment is has a structure that is generally represented by the following formula.

$$M_\alpha(Mg_X Li_\beta)Si_\alpha O_Y F_Z$$

(In the formula, M represents a cation having an ion exchange property, and specific examples thereof include sodium and lithium. Besides, $\alpha$, $\beta$, X, Y and Z represent coefficients, and $0 \leq \alpha \leq 0.5$, $0 \leq \beta \leq 0.5$, $2.5 \leq X \leq 3$, $10 \leq Y \leq 11$, and $1.0 \leq Z \leq 2.0$.). Examples of the production method for such a swellable fluorine mica include a melting method in which silicon oxide, magnesium oxide and various fluorides are mixed, and the mixture is completely melted in a temperature range of 1400 to 1500° C. in an electric furnace or a gas furnace, and during the cooling process, crystal growth of a swellable fluorine mica is allowed to occur within the reaction vessel.

There is another method for obtaining a swellable fluorine mica by using talc $Mg_\alpha Si_4 O_{10}(OH)_2$ as a starting material, and giving it a swellability through the intercalation of alkali metal ions (Japanese Patent Application Publication No. 2-149415 (JP-A-2-149415)). In this method, a swellable fluorine mica can be obtained by heating a mixture of an alkali silicofluoride and talc mixed at a predetermined compounding ratio at a heating temperature of 700 to 1200° C. in a porcelain crucible for a short time.

In this case, it is preferable that the amount of the alkali silicofluoride to be mixed with talc be in the range of 10 to 35 mass % of the entire mixture. If the amount of the alkali silicofluoride is outside this range, the production yield of the swellable fluorine mica tends to decline.

The montmorillonite used in this embodiment is represented by the following formula, and can be obtained by purifying a naturally produced one through the use of an elutriation or levigation process, etc.

$$M_a Si(Al_{2-a} Mg)O_{10}(OH)_2 \cdot nH_2O$$

(In the formula, M represents a cation such as sodium or the like, and $0.25 \leq a \leq 0.6$. The number of water molecules bound to the ion-exchanging cations between the layers is likely to change variously depending on conditions, such as the kind of cation, the humidity, etc., and therefore is represented by $nH_2O$.) As for the montmorillonite, the existence of isotopic ion substitution products, such as magnesian montmorillonite, iron montmorillonite, iron magnesian montmorillonite, etc., is known, and such an isotopic ion substitution product may also be used.

In this embodiment, there is no particular restriction regarding the initial particle diameter of the swellable lamellar silicate stated above. The initial particle diameter herein is the particle diameter of a swellable lamellar silicate as a raw material used for the production of a polyamide resin composition (A) that is used in this embodiment, and is different from the size of the silicate layers in the composite material. However, this particle diameter also has some effect on the property of the obtained polyamide composite material and, particularly, the rigidity and the heat resistance thereof. Therefore, it is desirable to consider this respect in selecting the mixture proportion of the swellable lamellar silicate mentioned above, and it is preferable to control the particle diameter through pulverization using a jet mill or the like if needed.

In the case where a swellable fluorine mica-based mineral is synthesized by an intercalation technique, the initial particle diameter can be changed by appropriately selecting the particle diameter of the talc that is a raw material. This is a preferable method in that when used in combination with pulverization, the method can adjust the initial particle diameter in a wider range.

The polyamide resin of the polyamide resin composition (A) in this embodiment is a polymer having amide bonds in the main chain whose main raw material is aminocarboxylic acid, lactam, or diamine and dicarboxylic acid (including salts of the two substances). As for the materials, concrete examples of the aminocarboxylic acid include 6-amicocaproic acid, 11-aminoundecanic acid, 12-aminododecanic acid, etc. Concrete examples of the lactam include ε-caprolactam, ω-undecanolactam, ω-laurolactam, etc. Concrete examples of the diamine include tetramethylene diamine, hexamethylene diamine, undecamethylene diamine, dodecamethylene diamine, etc. Concrete examples of the dicarboxylic acid include adipic acid, suberic acid, sebacic acid, dodecane dioic acid, etc. Furthermore, the diamine and the dicarboxylic acid can be used as a pair of salts.

Preferable examples of the polyamide resin include polycaproamide (nylon 6), polytetramethylene adipamide (nylon 46), polyhexamethylene adipamide (nylon 66), polycaproamide/polyhexamethylene adipamide copolymer (nylon 6/66), polyundecamide (nylon 11), polycaproamide/polyundecamide copolymer (nylon 6/11), polydodecamide (nylon 12), polycaproamide/polydodecamide copolymer (nylon 6/12), polyhexamethylene sebacamide (nylon 610), polyhexamethylene dodecamide (nylon 612), polyundecamethylene adipamide (nylon 116), and mixtures and copolymers thereof, etc. Among these, nylon 6 and nylon 66 are particularly preferable.

In this embodiment, the relative viscosity (molecular weight) of the polyamide resin composition (A) needs to be within a prescribed range. Specifically, with respect to the polyamide resin matrix of the polyamide resin composition (A), the relative viscosity measured using a solvent of a 96 mass % concentrated sulfuric acid under the condition of the temperature of 25° C. and the concentration of 1 g/dl need to be greater than or equal to 2.0. The value being less than 2.0 results in the production of a polyamide resin composition that is inferior in welding strength, and is therefore not preferable. Furthermore, it the amide-terminal group concentration of the polyamide resin composition (A) exceeds the 0.07 mmol/g, the mixture with the polyolefin-based resin composition (B) modified by an acid anhydride or the like tends to result in the gelation of the polyamide/polyolefin resin composition produced, and therefore such an amide-terminal group concentration is not preferable for a material in a molding or forming process.

As for the production method for the polyamide resin composition (A) in accordance with the embodiment, it basically suffices that, in the presence of an appropriately selected swellable lamellar silicate, a predetermined amount of monomers be placed in an autoclave, and then a melt polycondensation technique be performed using an initiation agent, such as water or the like, at a temperature of 240 to 300° C. and a pressure of 0.2 to 3 MPa for a time within the range of 1 to 15 hours. If nylon 6 is used as a resin matrix, it is preferable to perform the polymerization at a temperature of 250 to 280 and a pressure of 0.5 to 2 MPa for a time in the range of 3 to 5 hours.

Furthermore, in order to remove the monomer of the polyamide remaining in the polyamide resin composition after the polymerization, it is preferable to perform refinement using hot water with respect to pellets of the polyamide resin composition. In this case, it suffices that the process be performed in hot water of 90 to 100° C. for 8 hours or longer.

It is preferable that the compounding amount of the swellable lamellar silicate be 2 to 20 mass % as an ash content in the polyamide resin composition. If the compounding amount is less than 2 mass %, the fuel permeation resistance decreases, and therefore the resin tank weld member becomes unable to satisfactorily perform the function as a tank-purpose component part. On the other hand, if the compounding amount of the swellable lamellar silicate exceeds 20 mass %, it becomes difficult to take the produced polyamide resin composition from the autoclave, and therefore the yield considerably declines. Therefore, such a compounding amount is not preferable.

It is desirable to provide a step of mixing the swellable lamellar silicate and a portion of the amount of polyamide monomers that is necessary for a polymerization of the polyamide resin in a dispersion medium, such as water, methanol, ethanol, ethylene glycol, etc. In general, it is desirable in this step that the temperature condition in this process be room temperature, or may also be a temperature higher than or equal to the room temperature and less than or equal to the boiling point of the dispersion medium, and to use a homomixer, an ultrasonic dispersion machine, a high-pressure dispersion machine, etc.

In the production of the polyamide resin composition (A), an acid may be added. Generally speaking, the addition of an acid facilitates the cleavage of the swellable lamellar silicate so that the dispersion of the silicate layer into the polyamide resin matrix further progresses. Thus, the addition of an acid is preferable.

The foregoing acid may be either one of an organic acid and an inorganic acid if the pKa (25° C., a value in water) is 0 to 6 or a negative acid. Concretely, examples thereof include benzoic acid, sebacic acid, formic acid, acetic acid, chloroacetic acid, trichloroacetic acid, trifluoroacetic acid, nitrous acid, phosphoric acid, phosphorous acid, hydrochloric acid, hydrobromic acid, hydriodic acid, nitric acid, sulfuric acid, perchloric acid, etc.

It is preferable that the amount of the acid added be about 1.0 to 5.0 mol with respect to the entire positive-ion exchange capacity of the swellable lamellar silicate used, from viewpoint of the cleavage of the swellable lamellar silicate and the operation of the polymerized catalyst in the polyamide resin matrix.

For the production of the polyamide resin composition (A) of the embodiment, it is permissible to add a heat stabilizer, an antioxidant, a reinforcer, a pigment, a color protection, a weather proof agent, a flame retardant, a plasticizer, a crystal nucleus agent, a mold release agent, etc.

Examples of the heat stabilizer and the antioxidant include hindered phenols and the like, phosphorus compounds, hindered amines and the like, sulfur compounds, copper compounds, halides of alkali metal, and mixtures of these compounds and the like.

Examples of the reinforcer include clay, talc, calcium carbonate, zinc carbonate, wollastonite, silica, alumina, magnesium oxide, calcium silicate, sodium alminate, sodium aluminosilicate, magnesium silicate, glass balloon, carbon black, zeolite, hydrotalcite, metal fiber, metal whisker, ceramic whisker, potassium titanate whisker, boron nitride, graphite, glass fiber, carbon fiber, etc.

Examples of the polyolefin-based resin composition (B) used in this embodiment include polyethylene, polypropylene, α-olefin copolymers, etc. It is preferable that the density of the polyolefin-based resin composition (B) be greater than or equal to 0.92 g/cm$^3$. If the density thereof is less than 0.92 g/cm$^3$, the welding strength between a polyamide/polyolefin-based resin composition obtained by kneading the polyolefin-based resin composition (B) with the polyamide resin composition (A) and another polyolefin-based resin composition tends to decline when dipped in fuel, which is not preferable. Furthermore, the polyolefin-based resin composition (B) needs to be modified by an α,β-unsaturated carboxylic acid, an acid anhydride, etc., in order to obtain good compatibility with the polyamide resin composition (A). To obtain a kneaded product of a polyolefin-based resin composition and a polyamide resin composition, it is a common practice to employ a known method as shown in Japanese Patent Application Publication No. 53-1288 (JP-A-53-1288) in which the polyamide resin composition is grafted to the polyolefin resin made up of an α,β-unsaturated carboxylic acid or its ester and an acid anhydride and the like, and thus reformation is accomplished. This technique is also applied to the polyolefin-based resin composition.

It is preferable that the amount of modification be in the range of 1 to 4 mass parts per 100 mass parts of the polyolefin-based resin (B). The amount of modification being less than 1 mass parts results in a reduced welding strength between a polyamide/polyolefin-based resin composition obtained by kneading the polyolefin-based resin composition (B) with the polyamide resin composition (A) and another polyolefin-based resin composition, and is therefore not preferable. On the other hand, if the amount of modification exceeds 4 mass parts, generation of gas is exhibited during creation of the polyamide/polyolefin-based resin composition, and this composition cannot be obtained.

It is preferable that the compounding amount of the polyolefin-based resin composition (B) be 50 to 150 mass parts per 100 mass parts of the polyamide resin composition (A). If the compounding amount of the polyolefin-based resin composition (B) is less than 50 mass parts, the welding strength between the polyamide/polyolefin-based resin composition of the polyolefin-based resin composition (B) and the polyamide resin composition (A) combined and another polyolefin-based resin does not reach the reference value. On the other hand, the compounding amount of the polyolefin-based resin composition (B) being greater than 150 mass parts results in the fuel permeation resistance not reaching a reference value, and is therefore not preferable. Besides, through observation of the morphology of a resin composition excellent in the fuel permeation resistance and the welding strength in conjunction with another olefin-based resin composition as well as the strength retention rate following immersion of the polyolefin-based resin composition (B) in fuel, it has been found that the polyolefin-based resin composition has an island structure. In Japanese Patent Application Publication No. 2002-284991 (JP-A-2002-284991), a polyolefin-based resin forms continuous layers, which is different from this embodiment of the invention.

With regard to the mixing method for obtaining a polyamide/polyolefin-based resin composition by kneading the polyamide resin composition (A) and the polyolefin-based resin composition (B), a common melt kneading technique can be used. As for the melt kneading machine, a double-shaft type is more preferable than a single-shaft type. However, if a sufficient reaction time can be obtained, these resin compositions may be mixed and placed in a forming or molding machine to carry out the formation and the reaction can be simultaneously. It is preferable that the kneading temperature, for example, in the case of a polyamide 6 resin, be higher than or equal to 240° C. at which the polyamide resin composition (A) sufficiently melts, and less than 300° C. at which the polyamide resin composition (A) does not decompose.

With regard to the method for welding the polyamide/polyolefin-based resin composition obtained from the polyamide resin composition (A) and the polyolefin-based resin composition (B) with another polyolefin-based resin composition, there exist a heat welding technique, a vibration fusion technique, an ultrasonic welding technique, laser welding, an injection welding technique such as two-step forming or the like, etc. Any one of these techniques and the like may be used.

Next, the invention will be further concretely described with reference to examples. The raw materials and the measurement methods in the physical property test used in the examples and comparative examples described below will be first described.

1. Raw Materials

Swellable Fluorine Mica (M-1)

Sodium silicofluoride having an average particle diameter of 10 μm was mixed with talc pulverized to obtain an average particle diameter of 4.0 μm by a ball mill so that the amount of sodium silicofluoride was 15 mass % of the total amount. This mixture was put into a porcelain crucible, and was allowed to react in an electric furnace at 850° C. for 1 hour, so that a swellable fluorine mica (M-1) having an average particle diameter of 4.0 μm was obtained. The composition of this swellable fluorine mica was found to be $Na_{0.60}Mg_{2.63}Si_4O_{20}F_{1.77}$ and the positive-ion exchange capacity found by a measurement method described below was 110 milliequivalent/100 g.

2. Measurement Methods (1) Positive-ion Exchange Capacity

The positive-ion exchange capacity was found according to the positive-ion exchange capacity measurement method (JBAS-106-77) for bentonite (powder form) according to the Japan Bentonite Industry Association Standard Test Methods. Specifically, using a device formed by linking a leachate container, a leach pipe and a receiver in a longitudinal direction, a lamellar silicate was firstly subjected to a 1 N ammonium acetate aqueous solution adjusted to pH 7 so that the inter-layer ion-exchangeable cations are entirely exchanged with $NH_4^+$. After thorough washing with water and ethyl alcohol, the foregoing $NH_4^+$-type lamellar silicate was dipped in a 10 mass % potassium chloride aqueous solution so as to exchange the $NH_4^+$ in the specimen to $K^+$. Subsequently, the $NH_4^+$ leached out through the ion exchange reaction was subjected to the neutralization titration with a 0.1 N sodium hydroxide aqueous solution so as to find a positive-ion exchange capacity (milliequivalent/100 g) of the swellable lamellar silicate as a raw material.

(2) Inorganic Ash Content Rate of Polyamide Resin Composition (A)

The compounding amount of the swellable fluorine mica contained in the polyamide resin composition (A) is different from a value prepared initially since the degree of polymerization of ε-caprolactam is not 100% and unreacted substances are removed in a refinement step. Therefore, an amount of dried pellet of the obtained polyamide resin composition (A) precisely weighed out in a porcelain crucible was subjected to a burning process in air for 15 hours in an electric furnace kept at 500° C. After that, the residue was considered to be an inorganic ash content, and an inorganic ash content rate was found as in the following equation.

Inorganic ash content (mass %)=(inorganic ash content mass (g))/{the total mass of the specimen before the burning process (g)}×100

(3) Relative Viscosity (Molecular Weight) of Polyamide Resin (A) Matrix

Dried pellet of a polyamide composite material was dissolved in a 96 mass % concentrated sulfuric acid so that the concentration of the polyamide composite material was 1 g/dl, and was subjected to a G-C glass filter to filter out inorganic components. After that, a viscosity measurement was performed. The measurement was performed at 25° C. by using an Ubbelohde viscosimeter.

(4) Amino-Terminal Group Concentration of Polyamide Resin Composition (A)

The polyamide resin composition (A) was dissolved in a metal resol at 70° C., and was subjected to a G-E glass filter to filter out inorganic components. After that, the solution was titrated with a 0.1 mol/liter p-toluenesulfonic acid.

(5) Welding Strength of Polyamide/Polyolefin Resin Composition

Firstly, ISO dumbbell pieces made of a polyamide/polyolefin-based resin composition obtained from the polyamide resin composition (A) and the polyolefin-based resin composition (B) and of a polyethylene (520 MB by Prime Polymer Co., Ltd.) were each cut at a middle portion. After these cut pieces were welded by a heat welding technique, the tensile strength of each welded specimen was measured according to the ISO527 standard. In this example, the adopted reference tensile strength was 15 MPa or higher.

(6) Fuel Permeation Resistance of Polyamide/Polyolefin-Based Resin Composition 10 milliliter of isooctane/toluene/ethanol (=45/45/10 (volume ratio)) was put in a stainless steel-made container with a hole opened in an upper portion. To the upper potion, a polyamide/polyolefin-based resin composition piece formed so as to have a size of 50 mmφ, and 1 mm in thickness is attached. In this construction, fuel was emitted to the outside of the stainless steel container only through the resin composition. The stainless steel container was put into a drier at 60° C. The amount of reduction in the mass was measured, and from the measured value, a fuel permeation rate was calculated. In this example, the adopted reference fuel permeation rate was 0.5 mg·mm cm$^2$·24 h.

(7) Fuel Immersion Test of Polyamide/Polyolefin-Based Resin Composition

The dumbbell pieces obtained as described above were dipped in isooctane/toluene/ethanol (=45/45/10 (volume ratio)) at 60° C. for 120 hours. After that, the tensile strength of each piece was measured according to the ISO 527 standard. In this example, a retention rate of 60% or higher of the initial welding strength obtained in (5) was adopted as a reference.

(8) Morphology Observation of Polyamide Resin/Polyolefin-Based Resin

The obtained dumbbell pieces as described above were cut out into a thin piece through the use a diamond cutter, and was subjected to observation under a transmission electron microscope. The polyamide component was stained black with phosphotungstic acid, and the state of existence of the polyolefin-based resin composition was checked.

As shown in Table 1, polyamide resin compositions (A) PA1 to PA6 that are different in the relative viscosity, the amino-terminal group amount and the ash content amount were created. The method of creating these compositions will be described below.

TABLE 1

| Polyamide resin composition (A) | | | | | | | |
|---|---|---|---|---|---|---|---|
| | | PA1 | PA2 | PA3 | PA4 | PA5 | PA6 |
| Relative viscosity | — | 2.7 | 3.5 | 2.7 | 1.8 | 2.7 | 2.4 |
| Amino-terminal group concentration | mmol/g | 0.042 | 0.03 | 0.041 | 0.056 | 0.045 | 0.079 |
| Inorganic ash content rate | mass % | 5.3 | 5.2 | 3.9 | 5.3 | 0.9 | 5.3 |

REFERENCE EXAMPLE 1

Polyamide Resin Composition (PA1)

500 g of swellable fluorine mica M–1 (whose total positive-ion exchange capacity corresponds to 0.55 mol) was added to a solution obtained by mixing 1 kg of ε-caprolactam and 1 kg of water, and was stirred at room temperature for 1.5 hours by using a homomixer. The entire amount of this swellable fluorine mica dispersion was placed in an autoclave having an inner volume of 30 liters in which 9 kg of ε-caprolactam and 63.4 g (0.55 mol) of a 85 mass % phosphoric acid aqueous solution had previously been fed and melted at 95° C. Then, while being stirred, the dispersion was heated to 260° C. and was raised in pressure to 0.7 MPa. After that, while water vapor was gradually emitted, the dispersion was kept at the temperature of 260° C. and the pressure of 0.7 MPa for 1 hour followed by 1 hour of pressure discharge to normal pressure and then by 10 minutes of polymerization.

At the time of completion of the polymerization, the reaction product was discharged in the form of strands. After being cooled and solidified, the reaction product was cut to provide pellets made of the polyamide resin composition. Then, the pellets were refined with hot water of 95° C. for 8 hours, and were dried.

The inorganic ash content rate of the composition PA1 obtained in the ash content measurement was 5.3 mass %. In addition, the relative viscosity thereof was 2.7, ad the amino-terminal group concentration thereof was 0.042 mmol/g.

REFERENCE EXAMPLE 2

Polyamide Resin Composition (PA2)

A polyamide resin composition was produced in the same manner as in Reference Example 1, except that the polymerization time following the pressure discharge was 60 minutes. The content of the silicate layer in the composition PA2 obtained in the ash content measurement was 5.2 mass %. The relative viscosity thereof was 3.5, and the amino-terminal group concentration was 0.030 mmol/g.

REFERENCE EXAMPLE 3

Polyamide Resin Composition (PA3)

A polyamide resin composition was produced in the same manner as in Reference Example 1, except that 370 g of the swellable fluorine mica M–1 (whose total positive-ion exchange capacity corresponds to 0.41 mol) and 47.3 g (0.41 mol) of an 85 mass % phosphoric acid aqueous solution were compounded. The content of the silicate layer in the composition PA3 obtained in the ash content measurement was 3.9 mass %. The relative viscosity thereof was 2.7, and the amino-terminal group concentration was 0.041 mmol/g.

REFERENCE EXAMPLE 4

Polyamide Resin Composition (PA4)

A polyamide resin composition was produced in the same manner as in Reference Example 1, except that the polymerization time following the pressure discharge was 1 minute. The content of the silicate layer in the composition PA4 obtained in the ash content measurement was 5.3 mass %. The relative viscosity was 1.8, and the amino-terminal group-concentration was 0.056 mmol/g.

REFERENCE EXAMPLE 5

Polyamide Resin Composition (PA5)

A polyamide resin composition (A) was produced in the same manner as in Reference Example 1, except that 100 g of the swellable fluorine mica M–1 (whose total positive-ion exchange capacity corresponds to 0.11 mol) and 12.7 g (0.11 mol) of an 85 mass % phosphoric acid aqueous solution were compounded. The content of the silicate layer in the composition PA5 obtained in the ash content measurement was 0.9 mass %. The relative viscosity thereof was 2.7, and the amino-terminal group concentration was 0.045 mmol/g.

REFERENCE EXAMPLE 6

Polyamide Resin Composition (PA6)

A polyamide resin composition (A) was produced in the same manner as in Reference Example 1, except that after the pressure discharge, 40 g of hexamethylene diamine was compounded, and the subsequent polymerization time was 60 minutes. The content of the silicate layer in the composition PA6 obtained in the ash content measurement was 5.3 mass %. The relative viscosity thereof was 2.4, and the amino-terminal group concentration was 0.079 mmol/g.

Polyolefin-based resin compositions (B) PO1 to PO4 different in the density and the maleic anhydride compounding amount as shown in Table 2 were produced. The method of creating these compositions will be described below.

TABLE 2

| Polyolefin-based resin composition (B) | | | | | |
|---|---|---|---|---|---|
| | | PO1 | PO2 | PO3 | PO4 |
| Density of polyolefin-based resin | g/cm³ | 0.94 | 0.89 | 0.94 | 0.94 |
| Maleic anhydride compounding amount | mass part | 2.0 | 2.0 | 0.5 | 5.0 |

REFERENCE EXAMPLE 7

Polyolefin-Based Resin Composition (PO1)

10 kg of a polyethylene resin having a density of 0.94 g/cm³ was blended with 200 g of maleic anhydride, and the acid modification of the polyethylene resin was performed by using a double-shaft kneader and setting the temperature of the resin at 180° C. to 220° C.

REFERENCE EXAMPLE 8

Polyolefin-Based Resin Composition (PO2)

A polyolefin-based resin composition was produced in the same manner as in Reference Example 7, except that a polyethylene resin having a density of 0.89 g/cm$^3$ was used as a raw material.

REFERENCE EXAMPLE 9

Polyolefin-Based Resin Composition (PO3)

A polyolefin-based resin composition was produced in the same manner as in Reference Example 7, except that the compounding amount of maleic anhydride was 0.5 mass part.

REFERENCE EXAMPLE 10

Polyolefin-Based Resin Composition (PO4)

A polyolefin-based resin composition was produced in the same manner as in Reference Example 7, except that the compounding amount of maleic anhydride was 5.0 mass parts.

EXAMPLES 1 to 5

Polyamide/polyolefin resin compositions of Example 1 to 5 having compositions as shown in Table 3 were produced through melt kneading by using a TEM-37SS type extruder made by Toshiba Kikai Kabushiki Kaisha. The obtained resin compositions were subjected to the measurement for fuel permeation resistance and welding strength and to the fuel immersion test. Results are shown in Table 3.

Example 1

Figure 8:
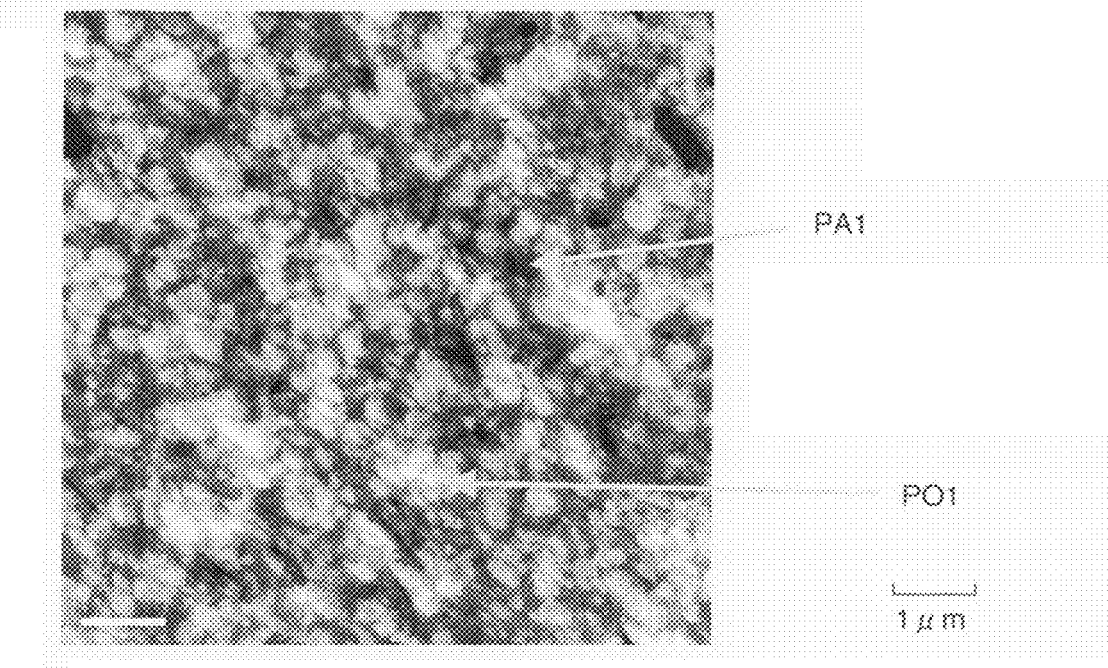
FIG. 8 is a photographic diagram for morphology observation of Example 1.

A polyamide/polyolefin-based resin composition was obtained by melting and kneading 100 mass parts of the resin composition (PA1) and 100 mass parts of the resin composition (PO) at 220° C. to 260° C. The welding strength of the obtained composition was 18 MPa, and the post-fuel immersion welding strength thereof was 15 MPa. The welding strength retention rate thereof was 83%, and the fuel permeation rate was 0.10 mg·mm/cm$^2$·24 h. These values satisfied their respective reference values. The morphology observation revealed that the polyolefin-based resin composition (PO1) had formed an island structure. A photograph in which the electron microscopic observation was performed is shown in FIG. 8.

Example 2

A polyamide/polyolefin-based resin composition was obtained by melting and kneading 100 mass parts of the resin composition (PA1) and 125 mass parts of the resin composition (PO1) at 220° C. to 260° C. The welding strength of the obtained composition was 25 MPa, and the post-fuel immersion welding strength thereof was 16 MPa. The welding strength retention rate thereof was 64%, and the fuel permeation rate was 0.20 mg·mm/cm$^2$·24 h. These obtained values satisfied their respective reference values. The morphology observation revealed that the polyolefin-based resin composition (PO1) had formed an island structure.

Example 3

A polyamide/polyolefin-based resin composition was obtained by melting and kneading 100 mass parts of the resin composition (PA1) and 75 mass parts of the resin composition (PO1) at 220° C. to 260° C. The welding strength of the obtained composition was 15 MPa, and the post-fuel immersion welding strength thereof was 10 MPa. The welding strength retention rate thereof was 67%, and the fuel perme-

TABLE 3

| | | Example 1 | Example 2 | Example 3 | Example 4 | Example 5 |
|---|---|---|---|---|---|---|
| (A) polyamide resin composition | weight part | PA1 = 100 | PA1 = 100 | PA1 = 100 | PA2 = 100 | PA3 = 100 |
| (B) polyolefin-based resin composition | weight part | PO1 = 100 | PO1 = 125 | PO1 = 75 | PO1 = 100 | PO1 = 100 |
| Fuel permeation rate | mg·mm/cm$^2$·24 h | 0.10 | 0.20 | 0.07 | 0.11 | 0.23 |
| Welding strength ($I_0$) | MPa | 18 | 25 | 15 | 20 | 18 |
| Welding strength (I) after fuel immersion | MPa | 15 | 16 | 10 | 16 | 16 |
| Welding strength retention rate $I_0/I$ | % | 83 | 64 | 67 | 80 | 89 |
| Morphology observation: state of existence of polyolefin resin | | Island | Island | Island | Island | Island | ation rate was 0.07 mg·mm/cm²·24 h. These obtained values satisfied their respective reference values. The morphology observation revealed that the polyolefin-based resin composition (PO1) had formed an island structure.

Example 4

A polyamide/polyolefin-based resin composition was obtained by melting and kneading 100 mass parts of the resin composition (PA2) and 100 mass parts of the resin composition (PO1) at 220° C. to 260° C. The welding strength of the obtained composition was 20 MPa, and the post-fuel immersion welding strength thereof was 16 MPa. The welding strength retention rate thereof was 80%, and the fuel permeation rate was 0.11 mg·mm/cm²·24 h. These obtained values satisfied their respective reference values. The morphology observation revealed that the polyolefin-based resin composition (PO1) had formed an island structure.

Example 5

A polyamide/polyolefin-based resin composition was obtained by melting and kneading 100 mass parts of the resin composition (PA3) and 100 mass parts of the resin composition (PO1) at 220° C. to 260° C. The welding strength of the obtained composition was 18 MPa, and the post-fuel immersion welding strength thereof was 16 MPa. The welding strength retention rate thereof was 89%, and the fuel permeation rate was 0.23 mg·mm/cm²·24 h. These obtained values satisfied their respective reference values. The morphology observation revealed that the polyolefin-based resin composition (PO1) had formed an island structure.

COMPARATIVE EXAMPLES 1 to 8

Polyamide/polyolefin resin compositions of Comparative Example 1 to 8 having compositions as shown in Table 4 were produced through melt kneading by using a TEM-37SS type extruder made by Toshiba Kikai Kabushiki Kaisha. The obtained resin compositions were subjected to the measurement for fuel permeation resistance and welding strength and to the fuel immersion test. Results are shown in Table 4.

TABLE 4

| | | Comparative Example 1 | Comparative Example 2 | Comparative Example 3 | Comparative Example 4 |
|---|---|---|---|---|---|
| (A) polyamide resin composition | weight part | PA1 = 100 | PA1 = 100 | PA4 = 100 | PA5 = 100 |
| (B) polyolefin-based resin composition | weight part | PO1 = 40 | PO1 = 200 | PO1 = 75 | PO1 = 100 |
| Fuel permeation rate | mg·mm/cm²·24 h | 0.06 | 5.1 | 0.12 | 14.2 |
| Welding strength ($I_0$) | MPa | 7 | 28 | 10 | 18 |
| Welding strength (I) after fuel immersion | MPa | 3 | 14 | 3 | 14 |
| Welding strength retention rate $I_0/I$ | % | 43 | 50 | 30 | 78 |
| Morphology observation: state of existence of polyolefin resin | | Island | Sea | Island | Island |

| | | Comparative Example 5 | Comparative Example 6 | Comparative Example 7 | Comparative Example 8 |
|---|---|---|---|---|---|
| (A) polyamide resin composition | weight part | PA6 = 100 | PA1 = 100 | PA1 = 100 | PA1 = 100 |
| (B) polyolefin-based resin composition | weight part | PO1 = 100 | PO2 = 100 | PO3 = 100 | PO4 = 100 |
| Fuel permeation rate | mg·mm/cm²·24 h | Forming × | 1.52 | 0.20 | Kneading × |
| Welding strength ($I_0$) | MPa | | 15 | 6 | |
| Welding strength (I) after fuel immersion | MPa | | 5 | 2 | |

TABLE 4-continued

| | | | |
|---|---|---|---|
| Welding strength retention rate I₀/I | % | 33 | 33 |
| Morphology observation: state of existence of polyolefin resin | | Sea | Sea |

Comparative Example 1

A polyamide/polyolefin-based resin composition was obtained by melting and kneading 100 mass parts of the resin composition (PA1) and 40 mass parts of the resin composition (PO1) at 220° C. to 260° C. The welding strength of the obtained resin composition was 7 MPa, and the post-fuel immersion welding strength thereof was 3 MPa. The welding strength retention rate thereof was 43%, and the fuel permeation rate was 0.06 mg·mm/cm²·24 h. The morphology observation revealed that the resin composition (PO1) had formed an island structure. It is considered that since the compounding amount of the resin composition (PO1) was small, the welding strength and the post-fuel immersion welding strength retention rate were lower than their reference values.

Comparative Example 2

Figure 9:
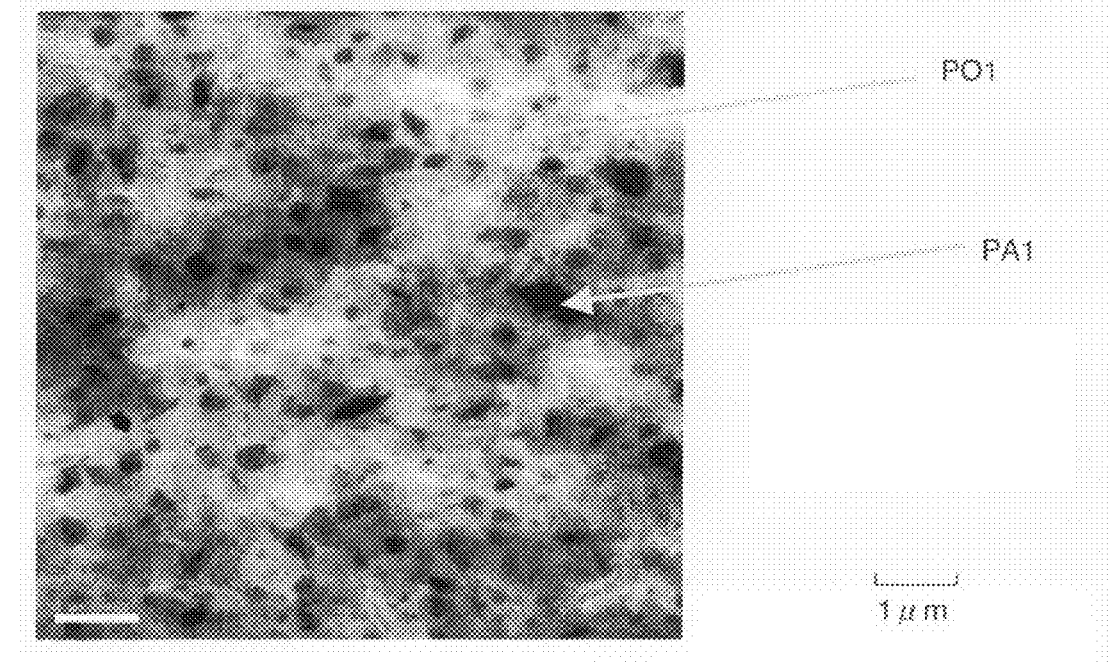
FIG. 9 is a photographic diagram for morphology observation of Comparative Example 2.

A polyamide/polyolefin-based resin composition was obtained by melting and kneading 100 mass parts of the resin composition (PA1) and 200 mass parts of the resin composition (PO1) at 220° C. to 260° C. The welding strength of the obtained resin composition was 28 MPa, and the post-fuel immersion welding strength thereof was 14 MPa. The welding strength retention rate thereof was 50%, and the fuel permeation rate was 5.1 mg·mm/cm²·24 h. It is considered that since the compounding amount of the resin composition (PO) was large, the post-fuel immersion welding strength retention rate was lower than its reference value and the fuel permeation rate was higher than its reference value. The morphology observation revealed that the resin composition (PO1) had formed a sea structure. A photograph in which the electron microscopic observation was performed is shown in FIG. 9.

Comparative Example 3

A polyamide/polyolefin-based resin composition was obtained by melting and kneading 100 mass parts of the resin composition (PA4) and 100 mass parts of the resin composition (PO1) at 220° C. to 260° C. The welding strength of the obtained resin composition was 10 MPa, and the post-fuel immersion welding strength thereof was 3 MPa. The welding strength retention rate thereof was 30%, and the fuel permeation rate was 0.12 mg·mm/cm²·24 h. The morphology observation revealed that the resin composition (PO1) had formed an island structure. It is considered that since the relative viscosity of the resin composition (PA4) was low, the welding strength and the post-fuel immersion welding strength were lower than their reference values.

Comparative Example 4

A polyamide/polyolefin-based resin composition was obtained by melting and kneading 100 mass parts of the resin composition (PA5) and 100 mass parts of the resin composition (PO1) at 220° C. to 260° C. The welding strength of the obtained resin composition was 18 MPa, and the post-fuel immersion welding strength thereof was 14 MPa. The welding strength retention rate thereof was 78%, and the fuel permeation rate was 14.2 mg·mm/cm²·24 h. The morphology observation revealed that the resin composition (PO1) had formed an island structure. It is considered that since the amount of the mica in the resin composition (PA5) was small, the fuel permeation rate was greater than its reference value.

Comparative Example 5

A polyamide/polyolefin-based resin composition was obtained by melting and kneading 100 mass parts of the resin composition (PA6) and 100 mass parts of the resin composition (PO1) at 220° C. to 260° C. When subjected to the forming process, the resin composition gelated, so that a sample for the measurements could not obtained.

Comparative Example 6

A polyamide/polyolefin-based resin composition was obtained by melting and kneading 100 mass parts of the resin composition (PA1) and 100 mass parts of the resin composition (PO2) at 220° C. to 260° C. The welding strength of the obtained resin composition was 15 MPa, and the post-fuel immersion welding strength thereof was 5 MPa. The welding strength retention rate thereof was 33%, and the fuel permeation rate was 1.52 mg·mm/cm²·24 h. The morphology observation revealed that the resin composition (PO2) had formed a sea structure. It is considered that since the density of the resin composition (PO2) was low, the welding strength and the post-fuel immersion welding strength retention rate were lower than their reference values, and the fuel permeation rate exceeded its reference value.

Comparative Example 7

A polyamide/polyolefin-based resin composition was obtained by melting and kneading 100 mass parts of the resin composition (PA1) and 100 mass parts of the resin composition (PO3) at 220° C. to 260° C. The welding strength of the obtained resin composition was 6 MPa, and the post-fuel immersion welding strength thereof was 2 MPa. The welding strength retention rate thereof was 33%, and the fuel permeation rate was 0.20 mg·mm/cm²·24 h. The morphology observation revealed that the resin composition (PO3) had formed a sea structure. It is considered that since the amount of the maleic anhydride modification of the resin composition (PO3) was small, the welding strength and the post-fuel immersion welding strength were lower than their reference values.

Comparative Example 8

100 mass parts of the resin composition (PA1) and 100 mass parts of the resin composition (PO4) were melted and kneaded at 220° C. to 260° C. However, a large amount of gas was generated, and it was difficult to perform the operation in the extrusion process, so that a polyamide/polyolefin-based resin composition could not be obtained.

The invention is not limited by the constructions of the foregoing embodiments or examples. On the contrary, it should be apparent that the invention can be appropriately changed in design without departing from the gist of the invention.

What is claimed is:

1. A resin tank weld member that is welded to a resin tank, the resin tank weld member being solely a single layer comprised of a polyamide/polyolefin-based resin composition obtained from:
   100 mass parts of a polyamide resin composition in which 2 to 20 mass parts of a silicate layer of a swellable lamellar silicate is dispersed at a molecular level with respect to 100 mass parts of a polyamide resin,
   a relative viscosity of the polyamide resin composition measured with a solvent of a 96 mass% concentrated sulfuric acid in a condition of a temperature being 25° C. and a concentration being 1 g/dl is greater than or equal to 2.0, and
   an amino-terminal group content of the polyamide resin composition is less than or equal to 0.07 mmol/g, and
   50 to 150 mass parts of a polyolefin-based resin composition obtained by modifying 1.0 to 4.0 mass parts per 100 mass parts of a polyolefin-based resin having a density that is greater than or equal to 0.92 g/cm$^3$ with an $\alpha,\beta$-unsaturated carboxylic acid or an acid anhydride.

2. The resin tank weld member according to claim 1, wherein the polyolefin-based resin has an island structure in the polyamide/polyolefin-based resin composition.

3. The resin tank weld member according to claim 1, wherein the resin tank weld member, together with a case having a valve member, forms a fuel control valve.

4. The resin tank weld member according to claim 3, wherein the case is welded to the resin tank weld member at a location inward of a weld portion between the resin tank weld member and the resin tank.

5. The resin tank weld member according to claim 3, wherein the case is attached to the resin tank weld member by snap fitting, at a location inward of a weld portion between the resin tank weld member and the resin tank.

6. The resin tank weld member according to claim 1, wherein the resin tank has a laminated structure that includes at least an outer shell that is outwardly located, and a fuel permeation prevention layer that is located inwardly of the outer shell.

7. The resin tank weld member according to claim 6, wherein a length of a weld portion of the resin tank weld member is greater than a thickness of the outer shell.

8. The resin tank weld member according to claim 1, wherein the swellable lamellar silicate has a structure that includes:
   negatively charged crystal layers whose main component is a silicate, and
   cations that exist between the crystal layers and that have an ion exchange capability,
   wherein a positive-ion exchange capacity of the swellable lamellar silicate is greater than or equal to 50 milliequivalent/100 g.

9. The resin tank weld member according to claim 1, wherein the swellable lamellar silicate is at least one of montmorillonite, beidellite, hectorite, sauconite, vermiculite, fluorine mica, muscovite, paragonite, bronze mica, lepidolite, margarite, clintonite, anandite, donbassite, sudoite, cookeite, clinochlore, shamonite, and nimite.

10. The resin tank weld member according to claim 1, wherein the polyamide resin of the polyamide resin composition is at least one of polycaproamide (nylon 6), polytetramethylene adipamide (nylon 46), polyhexamethylene adipamide (nylon 66), polycaproamide/polyhexamethylene adipamide copolymer (nylon 6/66), polyundecamide (nylon 11), polycaproamide/polyundecamide copolymer (nylon 6/11), polydodecamide (nylon 12), polycaproamide/polydodecamide copolymer (nylon 6/12), polyhexamethylene sebacamide (nylon 610), polyhexamethylene dodecamide (nylon 612), polyundecamethylene adipamide (nylon 116), mixtures thereof, and copolymers thereof.

11. The resin tank weld member according to claim 1, wherein the polyolefin-based resin composition is at least one of polyethylene, polypropylene, and an $\alpha$-olefin copolymer.

* * * * *